Oct. 26, 1937.   W. FOURNESS ET AL   2,096,712
REFRIGERATOR TRUCK
Filed Dec. 2, 1932    5 Sheets-Sheet 1

INVENTORS
Wilfred Fourness
Edward G. Burghard
BY John F. Lamm
ATTORNEY

Oct. 26, 1937.    W. FOURNESS ET AL    2,096,712
REFRIGERATOR TRUCK
Filed Dec. 2, 1932    5 Sheets-Sheet 2
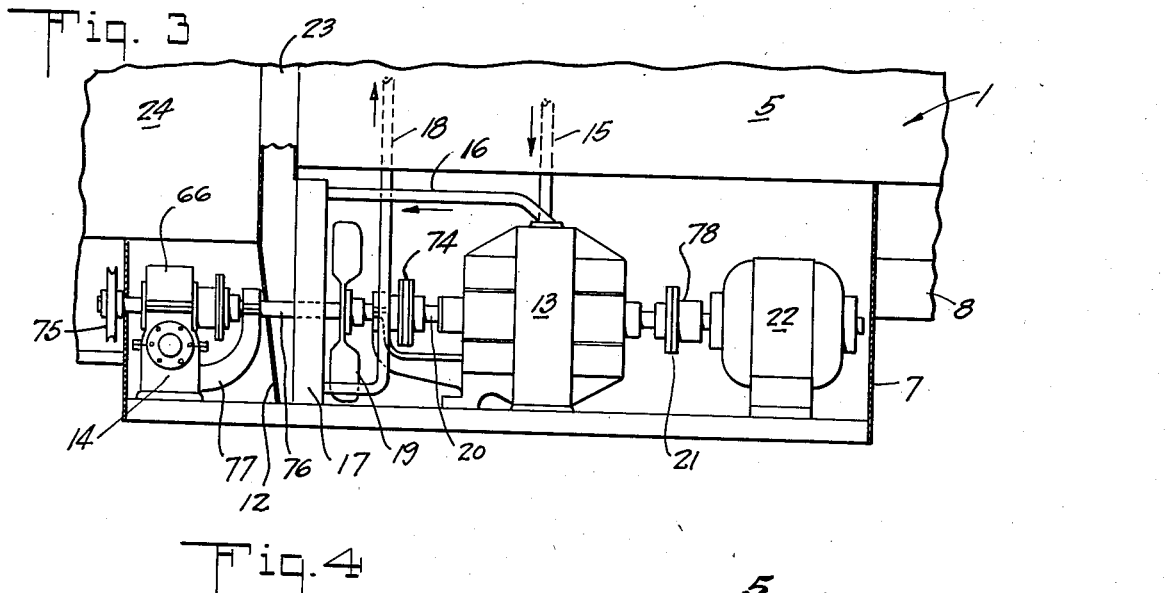
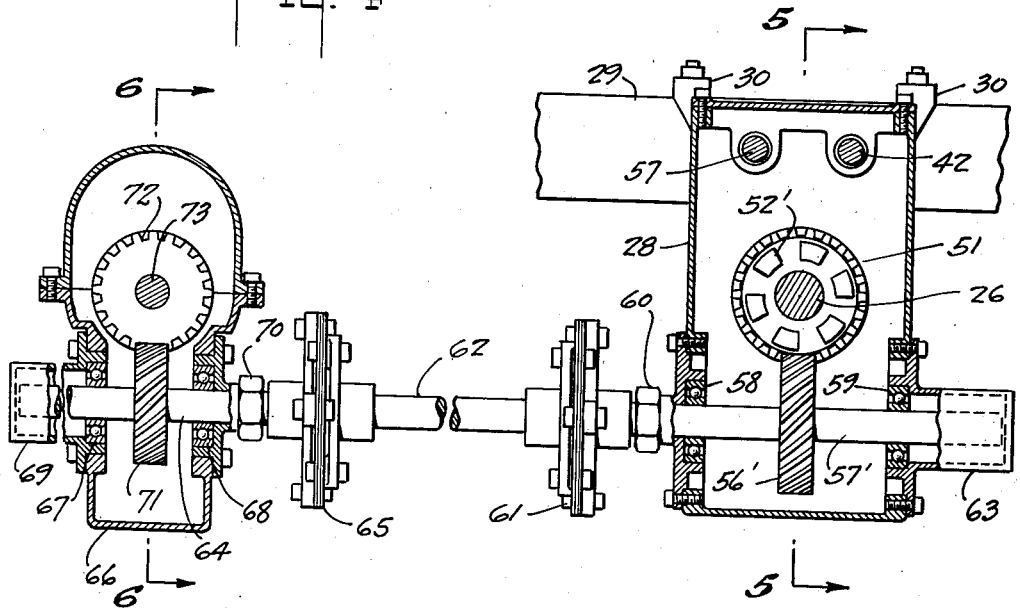
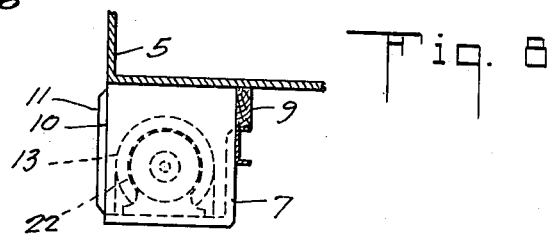
INVENTORS
Wilfred Fourness
Edward G. Burghard
BY John Flann
ATTORNEY Oct. 26, 1937.   W. FOURNESS ET AL   2,096,712
REFRIGERATOR TRUCK
Filed Dec. 2, 1932
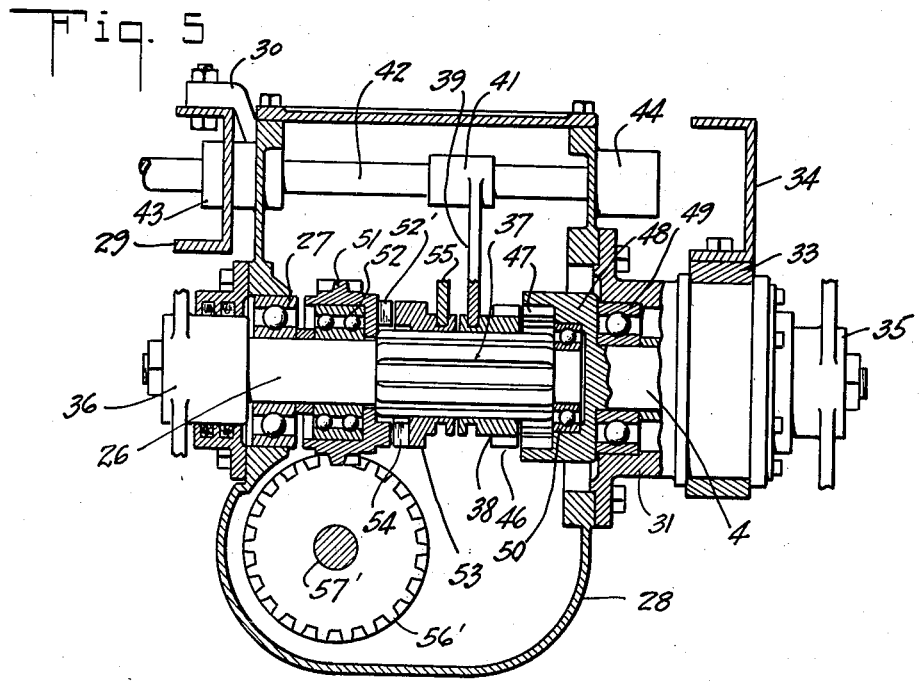
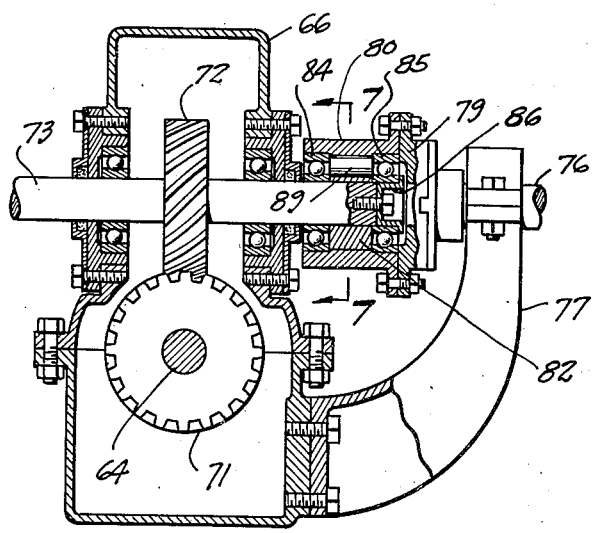
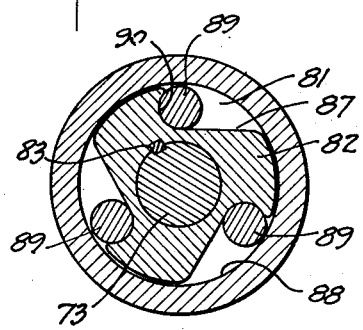
INVENTORS
Wilfred Fourness
Edward G. Burghard
BY John Flam
ATTORNEY Oct. 26, 1937.  W. FOURNESS ET AL  2,096,712
REFRIGERATOR TRUCK
Filed Dec. 2, 1932   5 Sheets-Sheet 4
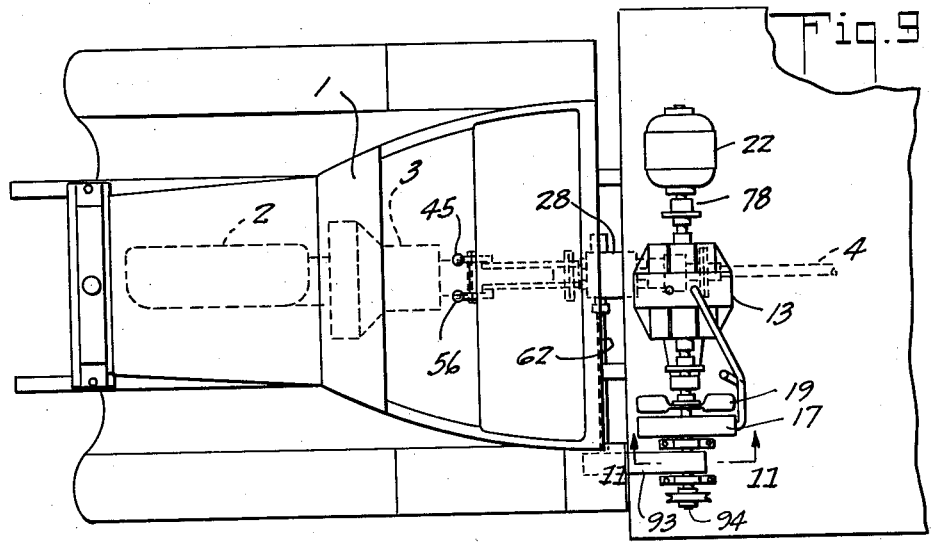
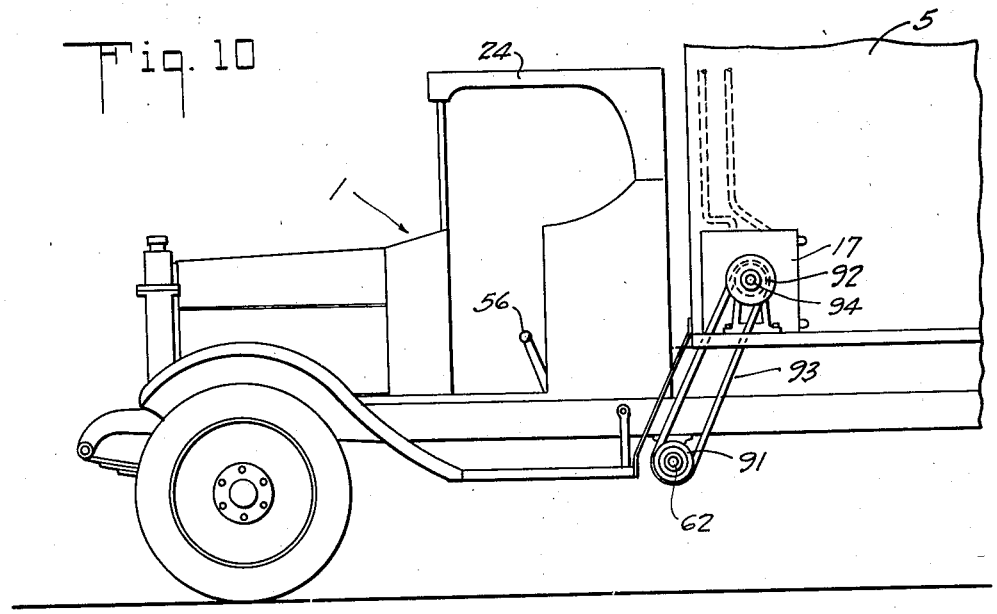
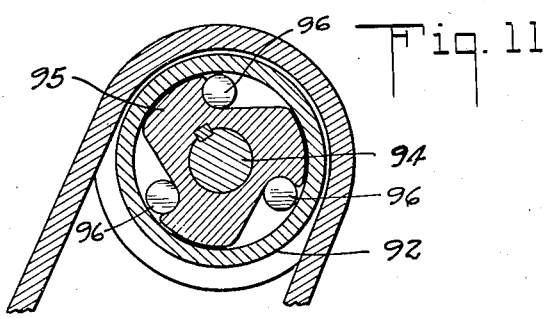
INVENTORS
Wilfred Fourness
Edward G. Byrghard
BY John Flam
ATTORNEY Oct. 26, 1937.   W. FOURNESS ET AL   2,096,712
REFRIGERATOR TRUCK
Filed Dec. 2, 1932   5 Sheets-Sheet 5
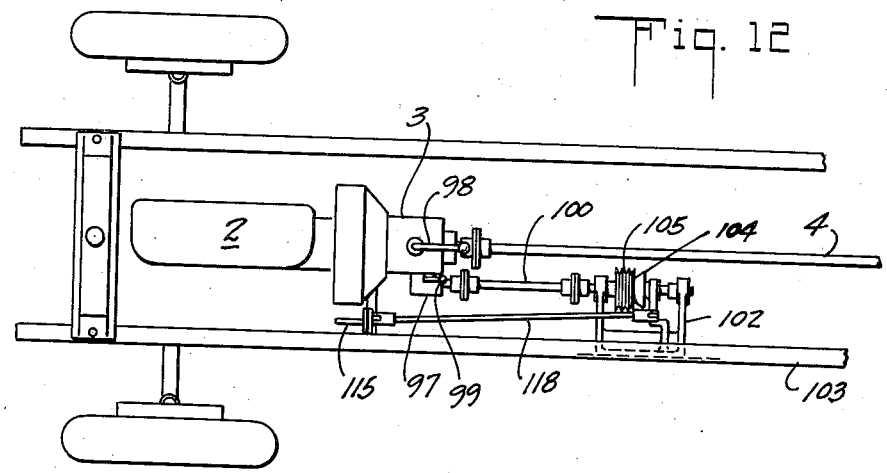
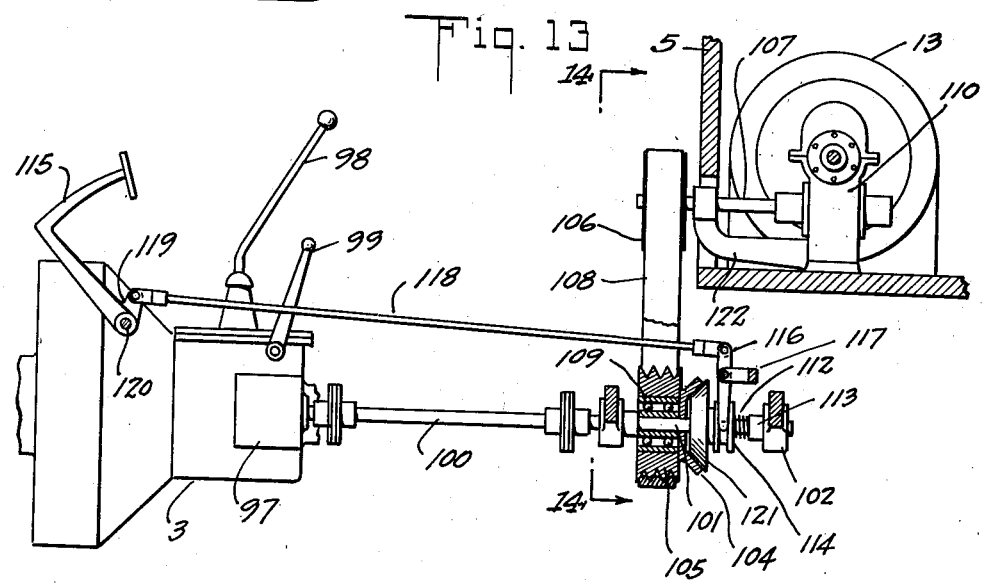
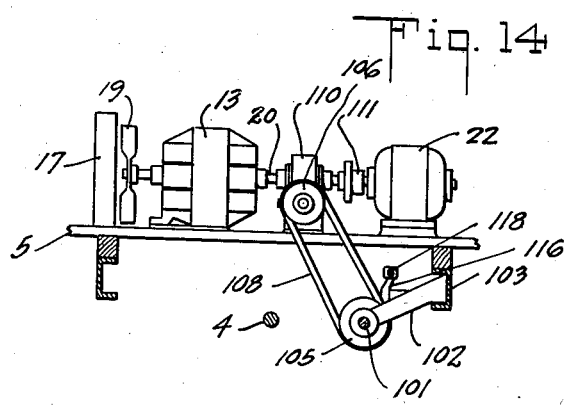
INVENTORS
Wilfred Fourness
Edward G. Burghard
BY John Flann
ATTORNEY Patented Oct. 26, 1937

2,096,712

UNITED STATES PATENT OFFICE 2,096,712

REFRIGERATOR TRUCK

Wilfred Fourness, Oakland, Calif., and Edward G. Burghard, New York, N. Y., assignors, by mesne assignments, to Fourness Development Corporation, Ltd.

Application December 2, 1932, Serial No. 645,370

5 Claims. (Cl. 62—117)

This invention relates to an automobile truck equipped with a mechanical refrigerating system, for cooling the truck body. In this way, perishable cargo can be kept in proper refrigerated condition during transit. Such trucks are now in use for transporting foods of various kinds.

More particularly, this invention relates to a truck of this character in which the automobile engine is used for supplying the power to the refrigerating system. It is one of the objects of this invention to improve in general, such truck refrigerating systems.

It is another object of the invention to provide a compact and simple motion transmission mechanism from the engine to the compressor of the refrigerating system; and especially one that can be controlled for connection and disconnection, independently of the transmission of power for propulsion of the truck.

In such transmission mechanisms the shifting of gears for varying the ratio of transmission to the propelling wheels is accomplished when the load from the engine is entirely disconnected, as by the aid of a clutch pedal. It is another object of this invention to make it possible to shift these gears easily, by disconnecting the refrigerating system from the engine during the shifting period.

It is still another object of this invention to provide a compressor mechanism for the refrigerating system that can be driven optionally either by the automobile engine or another source of power, such as an electric motor. This arrangement is especially useful where a loaded truck may be standing still for a long time in a place where a commercial source of electrical energy is available.

This invention possesses many other advantages, and has other objects which may be made more easily apparent from a consideration of several embodiments of the invention. For this purpose we have shown a few forms in the drawings accompanying and forming part of the present specification. We shall now proceed to describe these forms in detail, which illustrate the general principles of our invention; but it is to be understood that this detailed description is not to be taken in a limiting sense, since the scope of our invention is best defined by the appended claims.

Referring to the drawings:

Fig. 3 is an enlarged elevation showing the moving parts of the refrigerating system, the casing forming the compartment being shown in section;

Fig. 4 is an enlarged sectional view taken along plane 4—4 of Fig. 2, with one of the shafts shortened in order to reduce the size of the figure;

Fig. 5 is an enlarged sectional view, taken along the plane 5—5 of Fig. 4;

Fig. 6 is an enlarged sectional view, taken along plane 6—6 of Fig. 4;

Fig. 7 is an enlarged detail section taken through plane 7—7 of Fig. 6;

Fig. 8 is a detail sectional view taken along plane 8—8 of Fig. 2;

Fig. 9 is a plan view similar to Fig. 1, of a modified form of the invention, the body of the truck being merely outlined;

Fig. 10 is an elevation of the automobile truck shown in Fig. 9, but indicated in diagrammatic form;

Fig. 11 is an enlarged detail section, taken along plane 11—11 of Fig. 9;

Fig. 12 is a plan view of the portion of the chassis of a truck in which still another form of the invention is embodied;

Fig. 13 is a diagrammatic elevation of the structure shown in Fig. 12, some of the parts being in section; and Fig. 14 is a diagrammatic view taken along plane 14—14 of Fig. 13.

Figure 1:
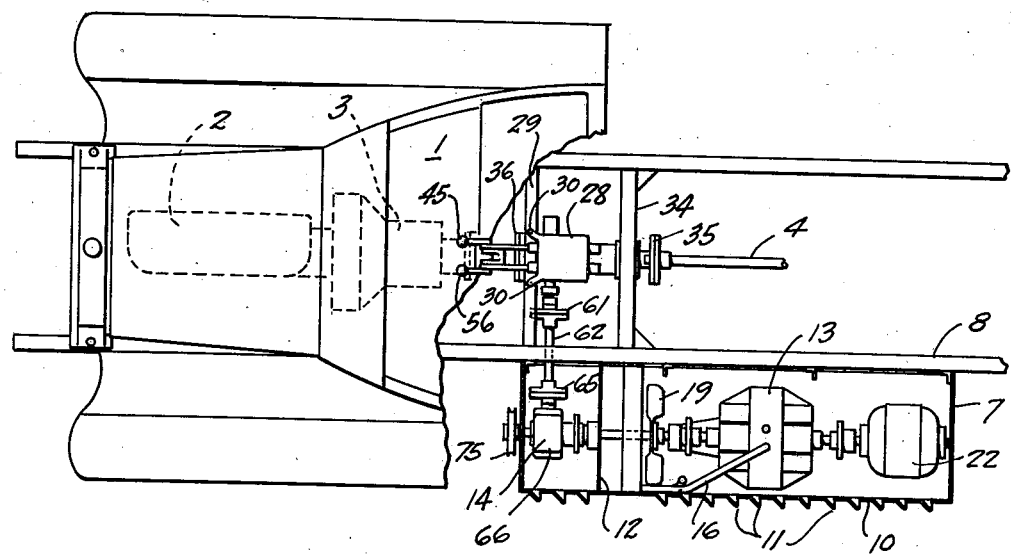
Figure 1 is a top plan view, partly broken away, of a truck in which the invention is incorporated, the housing for the moving parts of the refrigerating system being shown in section.
Figure 2:
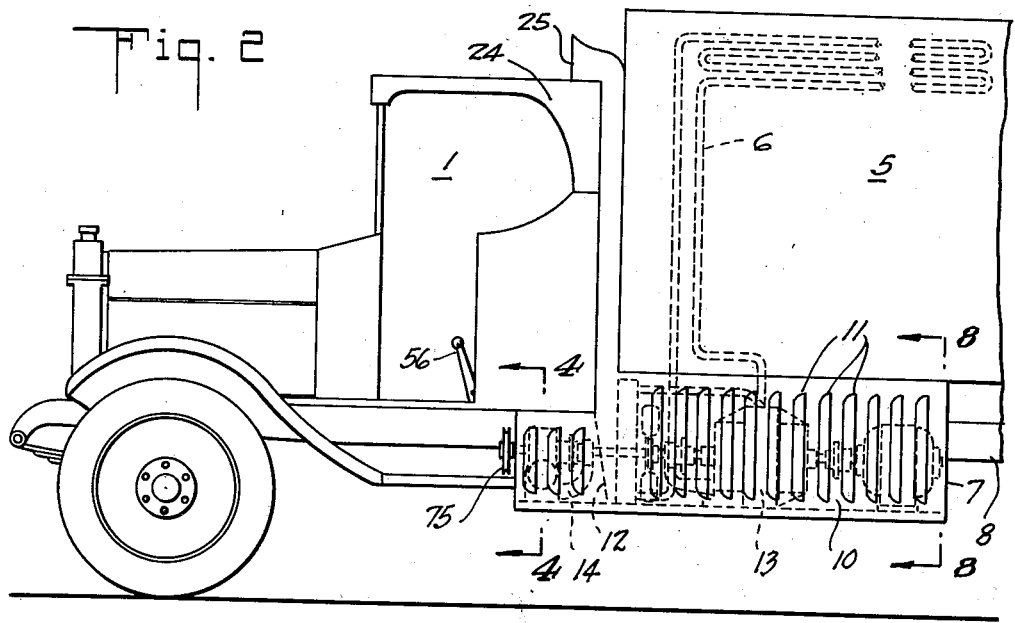
Fig. 2 is a side elevation of the apparatus illustrated in Fig. 1.

In the form of the invention shown in Figs. 1 to 8, inclusive, there is shown an automobile truck 1 (Figs. 1, 2 and 3). The engine for providing the propelling power is indicated diagrammatically at 2, Fig. 1. The main clutch, and the gear reducing and gear shift mechanism are shown as immediately in back of the engine 2, and enclosed in the housing 3 (Fig. 1). A propeller shaft 4, in this instance, is intended to drive the rear wheels, which are not shown.

Mounted upon the truck chassis is a body 5 (Figs. 2 and 8) forming a refrigerated compartment. The refrigeration is obtained by the aid of a mechanical refrigerating system carried by the truck body. More specifically, in the present instance, there is indicated a convoluted conduit 6 (Fig. 2) appropriately disposed in the body 5, through which refrigerant is circulated in a well understood manner for absorbing heat by vaporization of the fluid refrigerating medium.

The refrigerating mechanism for supplying refrigerant in liquid form to the conduit 6 may be housed in a compartment provided by casing 7 (Figs. 1, 2, 3 and 8). This casing can be appropriately formed of sheet metal, supported on appropriate parts of the chassis; for example (Figs. 1 and 8) the channel beam 8, and the beam 9 can support one side of the casing 7; and the bottom of the body 5, can be used to support the top of the casing. The front wall 10 of the casing 7 can be provided with a series of vertical louvres 11 (Figs. 1 and 2) for permitting air to circulate through the compartment. Furthermore, an intermediate partition 12 (Figs. 1 and 3) can be provided for forming separate compartments for the compressor 13 and a power transmission gear mechanism 14, respectively. This gear mechanism will be described hereinafter.

The refrigerating system may be of any conventional type, in which a liquid refrigerant is permitted to expand and vaporize in a region of low pressure, such as conduit 6, where the process of evaporation and expansion absorbs heat. The expanded or vaporized refrigerant is then led to the compressor 13. As indicated in Fig. 3, the expanded or vaporized refrigerant passes downwardly into the compressor 13 through conduit 15. The compressor 13 passes the compressed gaseous refrigerant through pipe 16 into the condenser 17, where the refrigerant is liquefied, and then passed through conduit 18 into the coil 6. This cycle is repeated as long as the system operates. The passage of the refrigerant to and from the convoluted conduit 6 can be automatically regulated as is well understood. Such automatic regulating devices can be incorporated in any part of the closed circulating system.

In order to cool the compressed refrigerant in condenser 17, a fan 19 can be used, driven from the same source of power as the compressor 13. This compressor has a shaft 20 which extends entirely through the compressor mechanism 13 and may be coupled at the right hand end as by coupling flange 21 to a source of power, such as an electric motor 22 for driving it. The electric motor 22, the compressor 13 and the condenser 17 can all be appropriately supported on the base of the casing 7.

Since the mode of operation of such refrigerating systems is well-known, further description is considered unnecessary. The electric motor 22 serves as an alternative form of power for operating the compressor 13 in case the engine 2 is at rest, as for instance when the truck is in a garage, or during an interruption in its transit.

In order to provide the cooling air stream past the condenser 17 and the fan 19, an upright conduit 23 (Figs. 2 and 3) connects to the interior of the casing 7 and is located between the cab 24 of the truck and the body 5 thereof. It has a horizontally extending mouth 25 directed toward the front of the automobile. In this way, motion of the automobile 1 will cause air to be captured in the mouth 25, and this air will be drawn in by the aid of the suction fan 19, through the condenser 17, and past the compressor 13. The air is finally discharged through the louvres 11.

Under ordinary conditions, the compressor shaft 20 is adapted to be driven by power provided by the engine 2. The engine 2 operates a shaft 26 (Figs. 4 and 5). This shaft is journalled, as by the aid of a ball bearing structure 27, in the side of a gear housing 28, which may be filled with grease, if desired. This gear housing can be supported on the truck chassis in any appropriate manner; for example, partly by the aid of cross channel beam 29, over which extend a number of supporting feet 30 connected to the housing 28. These feet can be bolted to beam 29.

The housing 28 can be further supported by the aid of boss 31, fastened to the opposite side of the housing, in the manner now to be described. The exterior surface of the boss 31 is cylindrical and can be encompassed by a support 33 fastened to the crossbeam 34 of the chassis, said boss 31 being capable of slight angular motion about its axis in support 33, to provide a self-aligning support. The propeller shaft 4 extends through this boss and is provided with a universal joint spider 36 arranged to be connected to a similar spider on the continuation of shaft 4. A similar spider 36 can be used for connecting shaft 26 to the forward portion of the drive shaft.

The mode in which power is transmitted from shaft 26 to propeller shaft 4 will now be described. In general these two shafts can be coupled together by the aid of relatively movable clutch members. Thus shaft 26 has a toothed end portion 37 (Fig. 5). On this toothed portion is splined a sliding clutch element 38. This clutch element is adapted to be axially adjusted, as by the aid of a shift lever 39 engaging in a groove 40 of the clutch element 38. This shift lever 39 is rigidly fastened as by the aid of its hub 41, to the shaft or bar 42 extending through appropriate bearing supports 43 and 44 in the sides of the housing 28. This shaft 42 is arranged to be slid manually in an axial direction by the operator, as by the aid of a knobbed lever 45 (Fig. 1). This lever is available for manipulation near the foot-board of the cab 24.

The clutch member 38 has a toothed clutching portion 46 adapted to engage between corresponding teeth 47 in a collar 48. This collar is rigidly fastened to the shaft 4. It is apparent from an inspection of Figure 5 that, for the position shown, the two clutch elements 38 and 48 are out of engagement. Upon movement of the shift shaft 42 to the right, a positive engagement is secured between teeth 46 and 47 and shaft 4 is thus coupled to shaft 26.

In order to support shaft 4 appropriately, a set of ball bearings 49 can be provided, the stationary race of which is fastened inside of boss 31. The right hand end of shaft 26 can also be appropriately supported by the aid of ball bearings 50, the outer race of which is supported on an inner surface of collar 48.

The arrangement is such that shaft 26 can also optionally transmit power to the compressor shaft 20. For this purpose, a spiral gear 51 (Figs. 4 and 5) is mounted for free rotation on shaft 26, as by the aid of ball bearings 52. However, this spiral gear 51 can be positively clutched to the shaft 26 in a manner now to be described.

The right hand portion of the gear 51 carries a series of radial teeth 52' forming one clutch element. The other clutch element is provided by a clutch collar 53 having corresponding radial teeth 54. This clutch collar is splined on portion 37 of shaft 26, and can be actuated by a shift lever 55 by the aid of a hand lever 56 in the cab 24, in a manner entirely similar to the actuation of shift lever 39. The hand lever 56 is connected to the shaft 57 (Fig. 4) to which is fastened the shift lever 55.

It is obvious that connection of the power transmission mechanism to the propeller shaft 4 or to the compressor mechanism can be effected independently of each other. Both the propeller shaft and the compressor mechanism are normally actuated, during transit, in which case the clutch members 53 and 38 are placed in engagement with the respective clutching elements, although they are shown in disconnected position in Fig. 5. Similarly, either of these clutch members can be independently actuated as desired.

Spiral gear 51 meshes with a spiral gear 56' mounted on shaft 57' (Figs. 4 and 5). This shaft extends at right angles to the driving shaft 26, and is appropriately supported in ball bearings 58 and 59 in the sides of the housing 28. A packing gland 60 can be provided where the shaft 57' extends out of the housing 28. This shaft in turn is connected as by a flexible coupling device 61 to an intermediate shaft 62. In order to make it possible to arrange shaft 62 so that it may extend either from the left hand side or from the right hand side of housing 28, the shaft 57' has a right hand extension, which is covered by a cap 63. This cap may be removed for permitting the accommodation of the flexible coupling on the right hand side of the shaft if desired. In that case, cap 63 would be fastened to the left hand side of the casing 28 to cover the protruding end of the shaft.

Shaft 62 is coupled to a shaft 64 by the aid of the flexible coupling device 65. This shaft (Figs. 4 and 6) extends through a gear housing 66 (which may be packed with grease) and is appropriately supported as by ball bearings 67 and 68 in the sides of the housing 66 (Fig. 4). This housing is also provided with a closure or cap 69, fastened in this instance to the left hand side of the casing 66 as viewed in Fig. 4. The right hand side of the casing 66 is provided with a packing gland 70. In this case also, flexible coupling device 65 can be fastened to either end of shaft 64, by appropriate interchange of cap 69 and packing gland 70.

Rigidly fastened to shaft 64 is a spiral gear 71. This spiral gear in turn meshes with a spiral gear 72 fastened to a shaft 73. This shaft 73 is in alignment with shaft 20 of the compressor 13 and is coupled thereto in a manner to be described.

The left hand end of shaft 73, as clearly illustrated in Fig. 3, extends through the end wall of casing 66 and carries an auxiliary drive pulley 75. Shaft 73 is coupled to compressor shaft 20 through the intermediary of an intermediate shaft 76. This shaft is appropriately journalled in a standard 77 fastened to the right hand side of casing 66, and is coupled to the compressor shaft 20, as by coupling 74. An overrunning clutch mechanism is provided between shaft 73 and 76. This is provided, so that when electric motor 22 operates the compressor 13, the shaft 73 will not be driven. A similar overrunning clutch is mounted in the housing 78 (Fig. 3) at the left hand end of the shaft of motor 22. This ensures that the motor will not be driven when shaft 73 is driven by the engine 2. Since both of these overrunning clutches are similar in construction, the overrunning clutch between shaft 73 and 76 only will be described. For this purpose reference may be had to Figs. 6 and 7.

Shaft 76 carries a flange 79 to which is bolted a cylindrical clutch collar 80, extending over the right hand end of shaft 73. This clutch collar provides an annular space 81 in which is accommodated a spider 82. This spider 82 is keyed to shaft 73, as by a key 83. Furthermore, if desired, the right hand end of shaft 73 can be supported in appropriate ball bearings 84 and 85 located respectively at opposite ends of the collar 80. A retainer cup or disc 86 can be fastened to the end of shaft 73 to hold the inner race of ball bearings 85 against axial movement.

The spider 83 is provided with a series of flat surfaces 87, forming with the inner surface 88 of collar 80 a series of wedging spaces. In these spaces are respectively accommodated friction clutching rollers 89. These clutching rolls are adapted to be wedged between the surfaces 87 and 88 and serve to couple the spider 82 to the cylindrical member 80. This coupling action is accomplished when shaft 73 rotates in a counterclockwise direction as viewed in Fig. 7. Under such circumstances the rollers 89 will be urged by the motion of the flat surfaces 87 toward the converging parts of the spaces 81. When shaft 73 is stationary, and shaft 76 is driven in a counterclockwise direction, as by the aid of motor 22, the rollers 89 will be urged against the cavities 90 formed in the spider 82. Under such conditions as viewed in Fig. 7, the rollers are ineffective to drive the shaft 73.

Exactly the same arrangement of rollers and wedging surfaces is provided in the housing 78. When shaft 20 of the compressor is driven by shaft 73 in a counterclockwise direction as viewed from the right hand end of Fig. 3, the clutching elements in housing 78 are ineffective; however, they are effective when motor 22 drives the compressor shaft 20.

It is apparent that in this form of the invention the compressor 13 for the refrigerating system can be optionally operated either by the electric motor 22 or from the engine 2, by appropriate manipulation of lever 56 and of switches for controlling motor 22. During standstill over extended periods, the motor 22 is merely switched into circuit and it will operate compressor 13 without driving shafts 62 and 73 or the mechanism in housing 28. Furthermore, since all the spiral gears 51, 56, 71 and 72 are shown as of the same size, the transmission ratio from shaft 26 to compressor 13 is unity. This therefore requires that compressor 13 has a range of high efficiency over the range of operation of the engine shaft 26. This is readily accomplished by appropriate design of the compressor 13.

In the form of the invention shown in Figs. 9, 10 and 11, the propeller shaft 4, housing 28 and levers 45 and 56 are arranged as before. However, in this case the compressor 13, motor 22 and condenser 17 are located inside of the truck body 5.

The mode of transmitting power from shaft 26 to the compressor shaft is simplified by the aid of a belt transmission. Thus the intermediate shaft 62 in this instance carries a pulley 91 (Fig. 10). A corresponding pulley 92 (Fig. 11) is coupled to pulley 91 as by the aid of the flexible belt 93. This pulley 92 is detachably coupled to the shaft by an overrunning clutching mechanism illustrated in Fig. 11. In this case the compressor shaft 94 carries the clutch spider 95 located within the pulley 92. The overrunning clutch rollers 96 are arranged as before, to rotate shaft 94 in a clockwise direction when pulley 92 is rotated in a clockwise direction, as viewed from the lower side of Fig. 9. A similar overrunning clutch mechanism is located in housing 78.

In the form of the invention shown in Figs. 12, 13 and 14, the power for the compressor 13 is provided by the aid of a conventional power take-off 97 located on the side of the gear shift mechanism 98. This power take-off can be controlled as by a lever 99, to couple or uncouple it from the engine transmission. An intermediate shaft 100 flexibly couples the power take-off 97 to another shaft 101. This shaft 101 is appropriately journalled at each end in a frame 102, fastened to a longitudinal channel 103 of the chassis. This shaft, in turn, carries a splined clutch element 121 for cooperation with a corresponding clutch member 104. This clutch member 104 is fastened to the hub of a pulley 105. This pulley in turn is adapted to drive a pulley 106, as by the aid of the flexible belt 108. Pulley 105, although supported on shaft 101, is free to rotate thereon except when clutch 121—104 is in driving position. Shaft 101 can be journalled in pulley 105, as by appropriate ball bearings 109.

Pulley 106 incorporates an overrunning clutch mechanism, such as illustrated in Fig. 11. This pulley is shown as supported on a cross shaft 107 extending into the vehicle body 5, and journalled in standard 122. Inside of this body is located the compressor 13 and the electric motor 22, as illustrated in Fig. 14. Shaft 107 extends through gear housing 110, which drives, by appropriate spiral gears, the shaft 20 of compressor 13. An overrunning clutch mechanism is also provided between the motor 22 and the shaft 20, in the housing 111.

Normally, the clutch elements 121 and 104 are kept in engagement as by the aid of a compression spring 112 (Fig. 13), for transmitting power to the compressor. This compression spring acts between the boss 113, through which shaft 101 extends, and the clutch collar 114.

In order to make it possible to shift gears readily when operating the automobile, it is essential that the compressor mechanism 13 be disconnected from the transmission during the gear shifting period. In the present instance this is provided by the aid of a connection between the main clutch pedal 115 and the clutch member 121. This main clutch pedal controls the transmission of power to the propeller shaft 4, and is depressed during the gear shifting operation. This depression also acts in the present instance to urge clutch member 121 to the right, so as to free the two members 121 and 104. This is accomplished by the aid of a lever 116, pivoted at an intermediate point on a standard 117. The lower end of the lever 116 engages a groove in the collar 114. The upper end of lever 116 is connected as by a link 118, to an arm 119 fastened to the main clutch shaft 120. It is apparent that depression of pedal 115 will pull the link 118 to the left, causing the clutch collar 114 to be urged to the right.

We claim:

1. In a refrigerating truck having a propelling engine, a cargo carrying body, and a cab adjacent the body, a refrigerating system including a compressor, means forming a compartment adjacent the body for housing said compressor, and means comprising an upwardly directed conduit extending from said compartment and between the body and the cab for circulating cooling air through said compartment.

2. In a refrigerating truck having a propelling engine, as well as a clutch mechanism between the engine and the propelling elements, a refrigerating system, a power transmission mechanism between the engine and the system, and means whereby said power transmission mechanism is disconnected in response to the disconnection of said clutch, comprising a clutch mechanism between the engine and the refrigerating system, and a connection between the two clutch mechanisms.

3. In a refrigerating truck having a propelling engine, as well as a clutch mechanism between the engine and the propelling elements, a refrigerating system, a power transmission mechanism between the engine and the system, and means whereby said power transmission mechanism is disconnected in response to the disconnection of said clutch, comprising a wheel, a connection between said wheel and the refrigerating system, a shaft upon which said wheel is rotatably mounted, said wheel being provided with a clutching surface, a clutch member splined on the shaft and movable toward and from the clutching surface, and a connection between said clutch member and the main clutch mechanism.

4. In a refrigerating truck, an engine for propelling a truck, a cargo carrying body, and a refrigerating system including a compressor, means for optionally putting the compressor into driving relation with said engine, a one way clutch interposed between said engine and said compressor, whereby said engine can drive said compressor in one direction only, an auxiliary motor for driving said compressor, and a second one way clutch between said motor and said compressor, to establish a one way driving connection from the motor to the compressor.

5. In a refrigerating truck having a propelling engine as well as a transmission mechanism and a clutch mechanism between the engine and the propelling elements, a refrigerating system, and a power transmission mechanism between the engine and the system, including a power take-off from the transmission mechanism, and a mechanical connection between the power take-off and the clutch mechanism to render the power take-off inactive when the clutch is disconnected.

WILFRED FOURNESS.
EDWARD G. BURGHARD.